(12) United States Patent
Nozaki et al.

(10) Patent No.: US 12,529,972 B2
(45) Date of Patent: Jan. 20, 2026

(54) TONER

(71) Applicant: CANON KABUSHIKI KAISHA, Tokyo (JP)

(72) Inventors: Dai Nozaki, Shizuoka (JP); Yoshitaka Suzumura, Shizuoka (JP); Tomohiro Unno, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 748 days.

(21) Appl. No.: 17/808,835

(22) Filed: Jun. 24, 2022

(65) Prior Publication Data
US 2023/0015518 A1    Jan. 19, 2023

(30) Foreign Application Priority Data
Jul. 2, 2021 (JP) .................................. 2021-110966

(51) Int. Cl.
| | |
|---|---|
| *G03G 9/087* | (2006.01) |
| *G03G 9/08* | (2006.01) |
| *G03G 9/083* | (2006.01) |
| *G03G 9/097* | (2006.01) |

(52) U.S. Cl.
CPC ......... *G03G 9/08755* (2013.01); *G03G 9/081* (2013.01); *G03G 9/0819* (2013.01); *G03G 9/0833* (2013.01); *G03G 9/08795* (2013.01); *G03G 9/09725* (2013.01)

(58) Field of Classification Search
CPC ............. G03G 9/08755; G03G 9/0833; G03G 9/0819; G03G 9/08795; G03G 9/09725; G03G 15/08
See application file for complete search history.

(56) References Cited

U.S. PATENT DOCUMENTS

| | | | |
|---|---|---|---|
| 5,449,583 A * | 9/1995 | Murofushi et al. ...... | G03G 9/09 |
| 5,660,959 A | 8/1997 | Moriyama et al. | |
| 7,123,862 B2 | 10/2006 | Hasegawa | |
| 7,582,401 B2 | 9/2009 | Ogawa | |
| 7,678,523 B2 | 3/2010 | Hiroko | |
| 7,678,524 B2 | 3/2010 | Hasegawa | |
| 7,811,734 B2 | 10/2010 | Ogawa | |
| 7,923,190 B2 | 4/2011 | Magome | |
| 7,935,467 B2 | 5/2011 | Dojo | |
| 8,227,162 B2 | 7/2012 | Sano | |
| 8,426,091 B2 | 4/2013 | Magome | |
| 8,426,094 B2 | 4/2013 | Magome | |
| 8,518,620 B2 | 8/2013 | Dojo | |
| 8,614,044 B2 | 12/2013 | Matsui | |
| 8,778,585 B2 | 7/2014 | Matsui | |
| 8,841,054 B2 | 9/2014 | Dojo | |
| 8,918,035 B2 | 12/2014 | Hasegawa | |
| 9,029,055 B2 | 5/2015 | Aoki | |
| 9,152,065 B2 | 10/2015 | Sano | |
| 9,213,250 B2 | 12/2015 | Nomura | |
| 9,235,151 B2 | 1/2016 | Tanaka | |
| 9,239,528 B2 | 1/2016 | Hasegawa | |
| 9,244,371 B2 | 1/2016 | Suzumura | |
| 9,377,708 B2 | 6/2016 | Magome | |
| 9,417,542 B2 | 8/2016 | Hiroko | |
| 9,423,711 B2 | 8/2016 | Uratani et al. | |
| 9,551,947 B2 | 1/2017 | Hiroko | |
| 9,625,841 B2 | 4/2017 | Hiroko | |
| 9,658,549 B2 | 5/2017 | Tanaka | |
| 9,804,514 B2 | 10/2017 | Suzumura | |
| 9,804,519 B2 | 10/2017 | Suzumura | |
| 9,841,692 B2 | 12/2017 | Hasegawa | |
| 9,880,478 B2 | 1/2018 | Shimano | |
| 9,927,728 B2 | 3/2018 | Arimura | |
| 9,946,179 B2 | 4/2018 | Arimura | |
| 9,946,181 B2 | 4/2018 | Hasegawa | |
| 9,964,874 B2 | 5/2018 | Suzumura | |
| 9,964,881 B2 | 5/2018 | Ikejiri | |
| 9,971,262 B2 | 5/2018 | Hasegawa | |

(Continued)

FOREIGN PATENT DOCUMENTS

| | | |
|---|---|---|
| CN | 104106007 A | 10/2014 |
| CN | 106842842 A | 6/2017 |
| CN | 106959594 A | 7/2017 |
| JP | 2003-262978 A | 9/2003 |
| JP | 2004-309517 A | 11/2004 |
| JP | 2005-17660 A | 1/2005 |
| JP | 2007-86458 A | 4/2007 |
| JP | 2007-140368 A | 6/2007 |
| JP | 2007-292981 A | 11/2007 |

(Continued)

OTHER PUBLICATIONS

U.S. Appl. No. 17/659,273, filed Apr. 14, 2022, Tomohiro Unno.

(Continued)

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, a nonmagnetic inorganic oxide particle A, and a magnetic iron oxide particle B, wherein a softening point of a chloroform-soluble component of the toner particle is not greater than 90° C.; the nonmagnetic inorganic oxide particle A and the magnetic iron oxide particle B are internally added to the toner particle; the nonmagnetic inorganic oxide particle A comprises as its main component at least one element selected from the group consisting of Si, Mg, Al, Ti, and Sr; a proportion of the inorganic oxide particles having a long diameter of specific length is in specific range; and a value of a ratio of a number-average particle diameter of the long diameter for the nonmagnetic inorganic oxide particle A, to a number-average particle diameter of the long diameter for the magnetic iron oxide particle B, is 5 to 30.

8 Claims, 1 Drawing Sheet

(56) References Cited

U.S. PATENT DOCUMENTS

| | | | |
|---|---|---|---|
| 9,971,263 B2 | 5/2018 | Fukudome | |
| 9,971,264 B2 | 5/2018 | Sano | |
| 10,012,923 B2 | 7/2018 | Sano | |
| 10,151,990 B2 | 12/2018 | Suzuki | |
| 10,228,627 B2 | 3/2019 | Nagashima | |
| 10,295,920 B2 | 5/2019 | Nishikawa | |
| 10,303,075 B2 | 5/2019 | Tanaka | |
| 10,310,397 B2 | 6/2019 | Sano | |
| 10,545,420 B2 | 1/2020 | Kinumatsu | |
| 10,698,327 B2 | 6/2020 | Nagashima | |
| 10,747,136 B2 | 8/2020 | Kenmoku | |
| 11,079,695 B2 | 8/2021 | Sato | |
| 11,099,493 B2 | 8/2021 | Komiya | |
| 11,181,839 B2 | 11/2021 | Yamashita | |
| 11,181,840 B2 | 11/2021 | Nagata | |
| 11,181,844 B2 | 11/2021 | Nagaoka | |
| 11,181,846 B2 | 11/2021 | Kinumatsu | |
| 11,333,989 B2 | 5/2022 | Unno | |
| 2002/0055052 A1* | 5/2002 | Komoto et al. | G03G 9/087 |
| 2005/0209364 A1 | 9/2005 | Yamagishi | |
| 2006/0121379 A1 | 6/2006 | Dojo | |
| 2008/0124643 A1 | 5/2008 | Yoshiba et al. | |
| 2008/0187856 A1 | 8/2008 | Broce et al. | |
| 2009/0197192 A1 | 8/2009 | Hiroko | |
| 2011/0229812 A1 | 9/2011 | Takahashi et al. | |
| 2012/0107741 A1* | 5/2012 | Hiraoka et al. | G03G 9/087 |
| 2012/0301160 A1* | 11/2012 | Shu | G03G 15/08 |
| 2014/0147785 A1 | 5/2014 | Matsushita et al. | |
| 2016/0266507 A1 | 9/2016 | Watanabe | |
| 2016/0378003 A1 | 12/2016 | Arimura | |
| 2018/0059561 A1 | 3/2018 | Nakashima et al. | |
| 2018/0329321 A1 | 11/2018 | Nakamura et al. | |
| 2020/0117107 A1* | 4/2020 | Tsujihiro | G03G 9/08 |
| 2020/0209771 A1 | 7/2020 | Hashimoto et al. | |
| 2020/0285161 A1* | 9/2020 | Takatsuna | G03G 9/08 |
| 2021/0080846 A1 | 3/2021 | Mizuguchi | |
| 2021/0286282 A1 | 9/2021 | Kobori et al. | |
| 2021/0356878 A1 | 11/2021 | Mizuguchi | |
| 2022/0026822 A1 | 1/2022 | Sato | |
| 2022/0026823 A1 | 1/2022 | Sano | |
| 2022/0146952 A1 | 5/2022 | Komiya | |
| 2022/0146955 A1 | 5/2022 | Nozaki | |
| 2022/0171301 A1 | 6/2022 | Suzumura | |
| 2022/0171302 A1 | 6/2022 | Sato | |
| 2022/0171303 A1 | 6/2022 | Hiramatsu | |
| 2023/0014130 A1 | 1/2023 | Sano | |

FOREIGN PATENT DOCUMENTS

| | | |
|---|---|---|
| JP | 2009-42386 A | 2/2009 |
| JP | 2010-26185 A | 2/2010 |
| JP | 2011-39382 A | 2/2011 |
| JP | 2014-139618 A | 7/2014 |
| JP | 2017-54001 A | 3/2017 |
| JP | 2019-12158 A | 1/2019 |
| JP | 2020-91327 A | 6/2020 |
| JP | 2020-144273 A | 9/2020 |
| KR | 10-2010-0098786 A | 9/2010 |

OTHER PUBLICATIONS

U.S. Appl. No. 17/812,536, filed Jul. 14, 2022, Yoshitaka Suzumura.
SYLYSIA Industrial Use, Synthetic Silica Specialist Company Fuji Silysia Chemical.

* cited by examiner

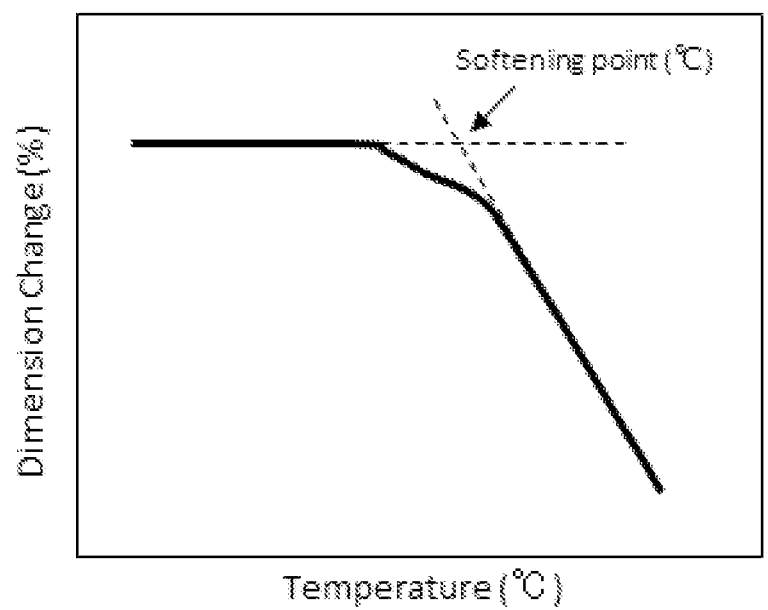

TONER

BACKGROUND OF THE INVENTION

Field of the Invention

The present disclosure relates to the toner used in recording methods that utilize, for example, an electrophotographic system.

Description of the Related Art

Image-forming devices, e.g., copiers, printers, and so forth, have been subject in recent years to an increasing diversification of intended applications and use environments, and in combination with this have also been subject to demands for higher speeds, higher image qualities, and higher stabilities. Within the realm of copiers and printers, machine downsizing and enhanced energy savings are at the same time making advances, with the use of magnetic single-component developing systems, which use magnetic toners that are advantageous with regard to these considerations, being preferred. In addition, it is also necessary to accommodate the specialty media encountered during the diverse intended applications in printing and to flexibly respond to different needs.

Electrophotographic methods proceed via a charging step, in which an electrostatic latent image bearing member (referred to hereafter as a photosensitive member) is charged by a charging means; a photo exposure step, in which the charged photosensitive member is exposed to light to form an electrostatic latent image; and a developing step, in which the electrostatic latent image is developed with toner to form a toner image. This is followed by image output via a transfer step, in which the toner image is transferred to a recording material, with or without an intervening intermediate transfer member, and a fixing step, in which fixing by the application of heat and pressure is performed by passing the toner image-bearing recording material through a nip region formed by a pressurization member and a rotatable image-heating member.

In order to respond to the demands of recent years for greater energy savings and to also accommodate the very diverse intended applications of recent years, a satisfactory fixing must be carried out at low temperatures and in addition a toner is required that has properties suitable for individual use environments and applications. In the case of monochrome printing, text printing occurs at high frequencies, and due to this a low-reflective matte quality is preferred for the printed material. In addition, the ability to accommodate the diversification of intended applications requires a toner capable of providing low-gloss, high-quality text printing even on smooth media such as posters, labels, films, and so forth. This requires that the low-temperature fixability coexist in good balance with low gloss.

A large amount of art has been disclosed to date with regard to improving the fixing performance. Within this realm, there is much art related to plasticizers, most prominently hydrocarbon waxes, ester waxes, and crystalline polyesters. Plasticizers enable low-temperature fixing by facilitating the melting of the toner binder; however, due to the melting and reduction in viscosity at low temperatures, the surface of the printed image readily becomes flat and smooth and the occurrence of an increased gloss is facilitated. Generally, when the low-temperature fixability of toner is increased, a greater viscosity reduction upon the application of heat is facilitated, and due to this there is a strong tendency for the surface of the printed image to become flat and smooth and for the gloss to be increased. In order for low-temperature fixability to coexist with low gloss, the technical problem arises that this relationship between viscosity reduction and high gloss must be abolished.

Art in which the image quality is improved by the addition of inorganic particles, e.g., silica, and adjustment of the toner viscosity, has been disclosed to date as related art, for example, in Japanese Patent Application Publication Nos. 2011-039382, 2009-042386, and 2004-309517.

SUMMARY OF THE INVENTION

However, this art is inadequate for suppressing the smoothing of toner that exhibits a viscosity reduction due to an enhanced low-temperature fixability, and, in particular with respect to media that have a smooth printing surface, there is room for improvement in order to bring about coexistence between low-temperature fixability and low gloss. The present disclosure provides a toner that exhibits an excellent low-temperature fixability and that enables low-gloss matte printing even on media that have a smooth printing surface.

The present disclosure relates to a toner comprising a toner particle comprising
a binder resin,
a nonmagnetic inorganic oxide particle A, and
a magnetic iron oxide particle B, wherein
a softening point of a chloroform-soluble component of the toner particle is not greater than 90° C.;
the nonmagnetic inorganic oxide particle A and the magnetic iron oxide particle B are internally added to the toner particle;
the nonmagnetic inorganic oxide particle A comprises as its main component at least one element selected from the group consisting of Si, Mg, Al, Ti, and Sr;
among nonmagnetic inorganic oxide particles A having a long diameter of at least 100 nm, a proportion of particles having a long diameter of 400 to 3,000 nm is at least 70 number %;
among the magnetic iron oxide particles B, a proportion of particles having a long diameter of 50 to 350 nm is at least 70 number %; and
a value of a ratio (the nonmagnetic inorganic oxide particle A/the magnetic iron oxide particle B) of a number-average particle diameter of the long diameter for the nonmagnetic inorganic oxide particle A, to a number-average particle diameter of the long diameter for the magnetic iron oxide particle B, is 5 to 30.

Thus, in accordance with the present disclosure, a toner can be provided that exhibits an excellent low-temperature fixability and that enables low-gloss matte printing even on media that have a smooth printing surface.

Further features of the present invention will become apparent from the following description of exemplary embodiments with reference to the attached drawing.

BRIEF DESCRIPTION OF THE DRAWINGS

The FIGURE is a diagram that provides a description of the softening point.

DESCRIPTION OF THE EMBODIMENTS

Unless specifically indicated otherwise, in the present disclosure the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination.

The present disclosure relates to a toner comprising a toner particle comprising
a binder resin,
a nonmagnetic inorganic oxide particle A, and
a magnetic iron oxide particle B, wherein
a softening point of a chloroform-soluble component of the toner particle is not greater than 90° C.;
the nonmagnetic inorganic oxide particle A and the magnetic iron oxide particle B are internally added to the toner particle;
the nonmagnetic inorganic oxide particle A comprises as its main component at least one element selected from the group consisting of Si, Mg, Al, Ti, and Sr;
among nonmagnetic inorganic oxide particles A having a long diameter of at least 100 nm, a proportion of particles having a long diameter of 400 to 3,000 nm is at least 70 number %;
among the magnetic iron oxide particles B, a proportion of particles having a long diameter of 50 to 350 nm is at least 70 number %; and
a value of a ratio (the nonmagnetic inorganic oxide particle A/the magnetic iron oxide particle B) of a number-average particle diameter of the long diameter for the nonmagnetic inorganic oxide particle A, to a number-average particle diameter of the long diameter for the magnetic iron oxide particle B, is 5 to 30.

The present inventors carried out intensive investigations in order to achieve, in monochrome printing, coexistence between fixation at lower temperatures, which is accompanied by a reduced viscosity by the toner, and the conflicting property of low gloss.

For example, a binder resin having a low softening temperature may be incorporated in order to achieve low-temperature fixability for toners. In addition, in order to reduce the softening point of the binder resin, a crystalline material, e.g., an ester compound, may also be incorporated as a plasticizer. Such a low-softening-point toner particle will melt at a lower temperature and will exhibit an excellent low-temperature fixability due to a reduced viscosity.

However, a reduced-viscosity toner particle is highly responsive to the pressure during fixation and readily spreads out and a smooth surface is then readily assumed during fixing. For rubber materials such as tires, a method is known in which fine particles of, e.g., carbon, are mixed as a filler in order to raise the viscosity and increase the strength. Similarly, for toners also, and as described in the aforementioned references, the viscosity of a toner can be raised and its strength can be increased by the incorporation of inorganic fine particles, e.g., silica. However, the fixing performance is impaired to the same extent. The technical problem thus occurs of achieving low-temperature fixation by thusly lowering the softening point of the toner particle, while also lowering the gloss in order to maintain the monochrome print quality.

The present inventors have discovered that both low-temperature fixation and reduced gloss can be achieved by the incorporation of two types of particles, i.e., a nonmagnetic inorganic oxide particle having a large particle diameter and a magnetic iron oxide particle that is smaller than the nonmagnetic inorganic oxide particle, but which is a relatively large nanoparticle.

The toner is described in the following. The toner particle comprises a nonmagnetic inorganic oxide particle A and a magnetic iron oxide particle B. The nonmagnetic inorganic oxide particle A comprises as its main component at least one element selected from the group consisting of Si, Mg, Al, Ti, and Sr. The nonmagnetic inorganic oxide particle A and magnetic iron oxide particle B are contained in the toner particle. Thus, these particles are mixed with the binder during the toner production process and assume a condition of internal addition in the toner particle interior when the toner is formed. For example, the nonmagnetic inorganic oxide particle A and magnetic iron oxide particle B are dispersed in the binder resin. The internally added particles preferably are uniformly dispersed in the interior of the toner particle.

Viewed from the standpoint of the low-temperature fixability, the softening point of the chloroform-soluble component of the toner particle must be not more than 90° C. This softening point preferably is from 55 to 85° C. and more preferably is from 60 to 80° C.

A toner particle for which the softening point of the chloroform-soluble component has been brought to less than or equal to 90° C., can undergo fixing at low temperatures in the fixing process, but its viscosity reduction is facilitated and the fixed image then assumes a high gloss. As a consequence, the value of the ratio of the number-average particle diameters of the long diameters (nonmagnetic inorganic oxide particle A/magnetic iron oxide particle B) is made from 5 to 30. In addition, at least 70 number % of the nonmagnetic inorganic oxide particles A having a long diameter of at least 100 nm are nonmagnetic inorganic oxide particles A having a long diameter of from 400 to 3,000 nm, and at least 70 number % of the magnetic iron oxide particles B are magnetic iron oxide particles B having a long diameter of from 50 to 350 nm. It was found that by doing this, the gloss of the fixed image can be reduced while preserving the low-temperature fixability.

The thinking of the present inventors on this will be described. For example, here, particles having a particle diameter of less than about 50 nm are designated small-diameter particles, particles having a particle diameter of about at least 50 nm and less than 400 nm are designated as medium-diameter particles, and particles having a particle diameter of at least 400 nm are designated as large-diameter particles. As noted above, during fixing the toner undergoes a viscosity reduction and readily spreads and becomes flowable. The flowability of the toner binder is suppressed by the presence in the toner of the medium-diameter magnetic iron oxide particles. In addition, due to the incorporation in the toner of the large-diameter nonmagnetic inorganic oxide particles, protruded portions are formed in the fixed image with these large-diameter particles as starting points. The image surface assumes a rough condition due to these protrusions, and a matte texture can be obtained due to a reduction in gloss due to light scattering.

So as to express a satisfactory suppressive effect on the viscosity and not impair fixing, the proportion of particles having a long diameter of from 50 to 350 nm for the magnetic iron oxide particle B is at least 70 number %. In addition, due to the action of the residual magnetization from the magnetic iron oxide particles, the particles are attracted to each other by microforces, and as a consequence fluidization can be effectively inhibited and an inhibition of fixing does not occur.

The proportion in the magnetic iron oxide particle B of particles having a long diameter of 50 to 350 nm is preferably 75 to 100 number %, more preferably 78 to 90 number %, and still more preferably 78 to 85 number %. The number % of magnetic iron oxide particle B particles having a long diameter of 50 to 350 nm can be controlled by adjusting the reaction conditions during the oxidation reaction in the iron oxide particle production process.

The nonmagnetic inorganic oxide particle A is an oxide particle that has as its main component at least one element selected from the group consisting of Si, Mg, Al, Ti, and Sr, which substantially avoids impairing the electrophotographic properties. Here, "main component" refers to that which exceeds 50 atomic % of the atoms contained in the inorganic oxide—excluding carbon and oxygen. Examples are at least one selection from the group consisting of $SiO_2$, $TiO_2$, MgO, $Al_2O_3$, and $SrTiO_3$. An Si-containing oxide particle is preferred. Silica particles are more preferred thereamong. Silica particles do not impair the electrophotographic properties, and exposure of silica particles on the fixed image surface is inhibited by the intermolecular forces between the resin and the surface hydroxyl groups.

In addition, in order to achieve a low gloss by forming protruded portions in the fixed image while maintaining an excellent low-temperature fixability, the proportion, among nonmagnetic inorganic oxide particles A that are at least 100 nm, of particles having a long diameter of from 400 to 3,000 nm is at least 70 number %.

Among nonmagnetic inorganic oxide particles A that are at least 100 nm, the proportion of particles having a long diameter of from 400 to 3,000 nm is preferably 75 to 100 number %, more preferably 80 to 98 number %, and still more preferably 85 to 97 number %. The number % of particles having a long diameter of 400 nm to 3,000 nm can be controlled by adjusting the pulverization force and time in the step of particle pulverization.

More preferably, in order to effectively form protruded portions, for nonmagnetic inorganic oxide particles A that are at least 100 nm, the proportion of particles having a long diameter of 800 to 3,000 nm is preferably at least 70 number %. For nonmagnetic inorganic oxide particles A that are at least 100 nm, the proportion of particles having a long diameter of from 800 nm to 3,000 nm is preferably 75 to 100 number %, more preferably 80 to 95 number %, and still more preferably 85 to 92 number %.

The number % of particles having a long diameter of 800 to 3,000 nm can be controlled by adjusting the pulverization force and time in the step of particle pulverization.

In addition, having the value of the ratio of the number-average particle diameter of the long diameter for the nonmagnetic inorganic oxide particle A, to the number-average particle diameter of the long diameter for the magnetic iron oxide particle B (nonmagnetic inorganic oxide particle A/magnetic iron oxide particle B), be 5 to 30 is optimal for not impairing fixing and for effectively forming protrusions. The value of this ratio is preferably 7 to 25 and is more preferably 8 to 20.

The number-average particle diameter of the long diameter of the nonmagnetic inorganic oxide particle A is preferably 400 to 3,000 nm, more preferably 800 to 2,800 nm, and still more preferably 1,200 to 2,600 nm. In addition, the number-average particle diameter of the long diameter of the magnetic iron oxide particle B is preferably 50 to 350 nm, more preferably 100 to 250 nm, and still more preferably 120 to 200 nm.

The softening point of the chloroform-soluble component of the toner is the softening point measured using thermomechanical analysis (TMA in the following). The toner particle is obtained by removing the external additive on the toner by ultrasound dispersion in an aqueous surfactant solution. The toner particle is dissolved in chloroform; the magnetic iron oxide particles are removed using a magnet; and the chloroform-insoluble matter is separated and removed using a centrifugal separator to obtain a chloroform solution. The chloroform is stripped off with an evaporator, and the chloroform is completely removed using a vacuum dryer to yield the chloroform-soluble matter in the toner.

20 mg of the resulting chloroform-soluble matter is converted using 5 kN into a pellet having a diameter of 5 mmφ and a thickness of 1 mm and TMA measurement is performed. The TMA measurement uses a Q400 from TA Instruments, and the measurement is carried out from 30° C. to 150° C. using 0.1 N and a ramp rate condition of 10° C./min and a probe diameter of 2.8 mmφ. Using the obtained displacement curve data, the softening point is taken to be the intersection between the original baseline and the tangent post-displacement (FIG. 1). The softening point can be achieved by optimal design of the molecular weight of the binder resin. In particular, the softening point can be lowered by incorporating a large amount of a low molecular weight component.

The means for removing the external additive from the toner to yield the toner particle is as follows. A dispersion medium is first prepared by introducing 6 mL of Contaminon N (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) into 100 mL of deionized water. 5 g of the toner is added to this dispersion medium and dispersion is carried out for 5 minutes using an ultrasound disperser (VS-150, As One Corporation). This is followed by placement in a "KM Shaker" (model: V. SX) from Iwaki Industry Co., Ltd., and shaking is performed for 20 minutes at 350 excursions per minute. This is followed by collection and recovery of the toner particles using a neodymium magnet.

The particle diameter of the magnetic iron oxide particle B is measured as follows. The toner particle is obtained by removing the external additive on the toner as described in the preceding. The toner particle is dissolved in chloroform and the magnetic iron oxide particles are recovered using a magnet. The obtained magnetic iron oxide particles are heated for 30 minutes at 800° C. using an electric oven or TGA to decompose the residual organic component. The residual magnetic iron oxide particles are recovered and submitted to SEM observation and EDX analysis. Observation is carried out at 10,000× for the observation magnification; particles are confirmed to comprise iron and oxygen by EDX analysis; and the long diameter of these particles is determined using image processing software. 200 particles are measured, the long diameter distribution is elucidated, and the number % of particles present in the 50 to 350 nm range is calculated. In addition, the number-average particle diameter is calculated from the average value of the 200 long diameters. The details are described below.

The particle diameter of the nonmagnetic inorganic oxide particle A is measured as follows. The toner particle is obtained by removing the external additive on the toner as described in the preceding. The toner particle is dissolved in chloroform and the magnetic iron oxide particles are removed using a magnet. The chloroform is stripped off using an evaporator, and the obtained solid material is heated for 30 minutes at 800° C. using an electric oven or TGA to decompose the residual organic component. The residual nonmagnetic inorganic oxide particles A are recovered and submitted to SEM observation and EDX analysis. Observation is carried out at 10,000× for the observation magnification; the particles are confirmed by EDX analysis to comprise oxygen and at least one element selected from the group consisting of Si, Mg, Al, Ti, and Sr; and the long diameter of these particles is determined using image processing software. 50 particles are measured, the long diameter distribution is elucidated, and the number % of particles present in the 400 to 3,000 nm range and the number % of particles present in the 800 to 3,000 nm range are calculated. In addition, the number-average particle diameter is calculated from the average value of the 50 long diameters. The details are described below.

There are no particular limitations on the method for producing the nonmagnetic inorganic oxide particle A and known methods can be employed. In particular, silica particle production methods include the following: vapor phase methods, in which silicon metal or a silicon compound such as a silicon halide or silane compound is reacted in the vapor phase; and wet methods in which a silane compound such as an alkoxysilane is subjected to hydrolysis and condensation reactions. The method for producing silica particles can be selected without restriction. A vapor-phase oxidation method, in which the powder starting material is directly oxidized in an oxygen-hydrogen chemical flame, is preferably used for the production of relatively large silica particles having a long diameter of at least 400 to 3,000 nm. The vapor-phase method can instantaneously bring the interior of the reaction vessel to at least the melting point of the inorganic fine powder and is a preferred method for obtaining large silica particles.

For example, silica particles of about 3,000 to 5,000 nm can be produced by the vapor-phase oxidation method described in the preceding and silica particles with the target size and shape can be obtained by pulverization by a known method. For example, the shape and particle diameter are readily controlled when a device having a high pulverization capacity, such as a pulverizer or jet mill, is used. In addition, as appropriate the particle size distribution can also be adjusted using a known classifier.

Similarly, the production method can also be selected without restriction in the case of the Mg, Al, Ti, and Sr oxide particles. For example, the oxide may be prepared by synthesis or purification from a mineral starting material and as necessary adjustment to the desired size and shape may be carried out using pulverization and/or classification.

The method for producing the magnetic iron oxide particle B is also not particularly limited, and the following method can be used. An alkali, e.g., sodium hydroxide, is added—in an amount that is an equivalent or more than an equivalent with reference to the iron component—to an aqueous solution of a ferrous salt to prepare an aqueous solution containing ferrous hydroxide. Air is blown in while keeping the pH of the prepared aqueous solution at pH 7 or above, and an oxidation reaction is carried out on the ferrous hydroxide while heating the aqueous solution to at least 70° C. to initially produce seed crystals that will form the core of the magnetic iron oxide particles.

An aqueous solution containing ferrous sulfate is then added, at approximately 1 equivalent based on the amount of addition of the previously added alkali, to the seed crystal-containing slurry. While maintaining the pH of the liquid at 5 to 10 and blowing in air, the reaction of the ferrous hydroxide is developed in order to grow magnetic iron oxide using the seed crystals as cores. At this point, the shape and magnetic properties of the magnetic iron oxide particles can be controlled by free selection of the pH, reaction temperature, and stirring conditions and as necessary by the addition of an additive. The pH of the liquid transitions to the acidic side as the oxidation reaction progresses, but the pH of the liquid preferably does not drop below 5. The thusly obtained magnetic iron oxide particles are filtered, washed, and dried by standard methods to obtain the magnetic iron oxide particles.

The magnetic iron oxide particles can be exemplified by magnetite, maghemite, ferrite, and so forth; by their alloys with metals such as silica, aluminum, copper, magnesium, tin, zinc, beryllium, calcium, manganese, selenium, titanium, tungsten, and vanadium; and by mixtures of the preceding.

The shape of the magnetic iron oxide particles can be octahedral, hexahedral, spherical, acicular, flake, and so forth, and, while any shape can be used, polyhedrons that are tetrahedral or greater are preferred and polyhedral structures that are octahedral or greater are more preferred.

In order to optimally maintain the electrophotographic properties, the content of the magnetic iron oxide particle B, expressed per 100 mass parts of the binder resin, is preferably 50 to 150 mass parts and is more preferably 60 to 120 mass parts.

The content of the nonmagnetic inorganic oxide particle A, per 100 mass parts of the binder resin, is preferably 0.1 to 5.0 mass parts, more preferably 0.3 to 3.0 mass parts, and still more preferably 0.5 to 2.5 mass parts.

In addition, the residual magnetization ($\sigma r$), as a magnetic property of the magnetic iron oxide particle B, is preferably adjusted. The residual magnetization ($\sigma r$) of the magnetic iron oxide particle B is preferably 2 to 24 $Am^2/kg$, more preferably 4 to 18 $Am^2/kg$, and still more preferably 6 to 10 $Am^2/kg$. By adjusting the $\sigma r$ downward, the toner undergoes thorough dispersion during development, and there is an effect on the low-temperature fixing due to the scattering. The addition of Si may be used as a method for adjusting the $\sigma r$. The Si content in the magnetic iron oxide particle B is preferably 0.5 to 3 mass % in order to establish an optimal $\sigma r$.

In addition, low-temperature fixability and low gloss are readily achieved when the ratio between the magnetic iron oxide particle B content and the nonmagnetic inorganic oxide particle A content is adjusted. Specifically, in transmission electron microscopic observation of a cross section of the toner provided by sectioning with a microtome, the value of the ratio of the number of magnetic iron oxide particles B to the number of nonmagnetic inorganic oxide particles A present in the cross section of the toner particle (magnetic iron oxide particle B/nonmagnetic inorganic oxide particle A) is preferably 50 to 500. 100 to 400 is more preferred and 150 to 300 is more preferred.

Moreover, in transmission electron microscopic observation of a cross section of the toner provided by sectioning with a microtome, 0.5 to 5.0 nonmagnetic inorganic oxide particles A are preferably present per 1 toner cross section. 0.7 to 3.0 is more preferred and 0.8 to 1.5 is still more preferred. Protrusions are effectively formed in the fixed image surface as a consequence, and low-temperature fixability and low gloss are then even more readily achieved. In addition, fixed image defects due to detachment of the protruded portions are readily suppressed by specifying less than or equal to 5.0.

In addition, in transmission electron microscopic observation of a cross section of the toner provided by sectioning with a microtome, the number of magnetic iron oxide particles B present per 1 toner cross section is preferably 100 to 500, more preferably 120 to 450, and still more preferably 200 to 400.

With regard to particle shape, the nonmagnetic inorganic oxide particle A preferably has an irregular shape, while the magnetic iron oxide particle B preferably is spherical or has a near-spherical shape, e.g., octahedral or hexahedral. Specifically, in transmission electron microscopic observation of a cross section of the toner provided by sectioning with a microtome, the shape factor SF1 of the nonmagnetic inorganic oxide particle A is preferably at least 140 and the shape factor SF1 of the magnetic iron oxide particle B is preferably not more than 110. The shape factor SF1 of the nonmagnetic inorganic oxide particle A is more preferably 143 to 160 and still more preferably 147 to 155. The shape factor SF1 of the magnetic iron oxide particle B is more preferably 100 to 109 and still more preferably 102 to 107.

The effects on the low-temperature fixability and low gloss are more readily evidenced by controlling the shape in this manner. Thus, with regard to magnetic iron oxide particles B that are present above or at the top of a nonmagnetic inorganic oxide particle A, having the nonmagnetic inorganic oxide particle A have an irregular shape serves to inhibit the magnetic iron oxide particles B from dropping down, by catching on the irregular portions, to below the nonmagnetic inorganic oxide particle A during the fixing step, thus enabling the formation of resin-encompassed protrusions as such. This can provide an inhibition of the exposure of nonmagnetic inorganic oxide particles A on the fixed image and an inhibition of fixing defects due to exfoliation that starts from the nonmagnetic inorganic oxide particle A. The shape factor SF1 of the nonmagnetic inorganic oxide particle A can be controlled by adjusting the pulverization force and time in the particle pulverization step. The shape factor SF1 of the magnetic iron oxide particle B can be controlled by adjusting the reaction conditions associated with the oxidation reaction in the process of iron oxide particle production.

The toner contains a binder resin. The binder resin is not particularly limited, and known materials, e.g., vinyl resins, polyester resins, and so forth, can be used.

The following can specifically be used: polystyrene; styrene copolymers, e.g., styrene-propylene copolymers, styrene-vinyltoluene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-octyl methacrylate copolymers, styrene-butadiene copolymers, styrene-isoprene copolymers, styrene-maleic acid copolymers, and styrene-maleate ester copolymers; as well as polyacrylate esters, polymethacrylate esters, polyvinyl acetate, and so forth. A single one of these may be used or a combination of a plurality may be used.

The binder resin preferably contains an amorphous polyester resin. This makes material design in support of low-temperature fixing relatively easy, and, with respect to protrusion formation on the image surface, also facilitates the occurrence of interaction between the resin and nonmagnetic inorganic oxide particle A. In addition, the content of the amorphous polyester resin in the binder resin is preferably at least 50 mass %, more preferably 75 to 100 mass %, and still more preferably 90 to 100 mass %. This serves to further facilitate obtaining the aforementioned actions.

Common amorphous polyester resins constituted of an alcohol component and an acid component can be used as the amorphous polyester resin, and examples of these two components are provided in the following.

Dihydric alcohol components can be exemplified by ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, bisphenol derivatives represented by formula (A), hydrogenates of compounds represented by the formula (A), diols represented by formula (B), and hydrogenates of the diols represented by formula (B).

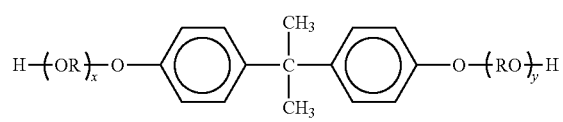
(A)

[In the formula, R is an ethylene or propylene group, x and y are each integers equal to or greater than 1, and the average value of x+y is 2 to 10.]

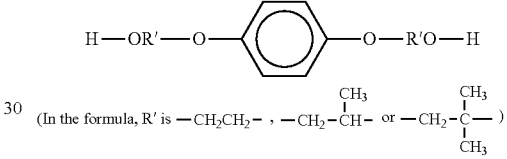
(B)

Dibasic acid components can be exemplified by benzenedicarboxylic acids and their anhydrides, such as phthalic acid, terephthalic acid, isophthalic acid, and phthalic anhydride; alkyl dicarboxylic acids such as succinic acid, adipic acid, sebacic acid, and azelaic acid, and their anhydrides; succinic acid substituted by an alkyl group having from 6 to 18 carbons or by an alkenyl group having from 6 to 18 carbons, and their anhydrides; and unsaturated dicarboxylic acids such as fumaric acid, maleic acid, citraconic acid, and itaconic acid, and their anhydrides.

At least trihydric alcohol components can be exemplified by glycerol, pentaerythritol, sorbitol, sorbitan, and oxyalkylene ethers of novolac-type phenolic resins, and at least tribasic acid components can be exemplified by trimellitic acid, pyromellitic acid, 1,2,3,4-butanetetracarboxylic acid, benzophenonetetracarboxylic acid, and their anhydrides.

The softening point of the chloroform-soluble matter of the toner particle can be controlled through design of the binder resin. For example, the softening point can be controlled through adjustment of the crosslink density and/or control of the molecular weight, but is preferably controlled using the content of the low molecular weight component. The low molecular weight component can be checked using the number-average molecular weight (Mn) yielded by GPC measurement. In order to achieve a more thorough appearance of the low-temperature fixability, the number-average molecular weight (Mn) of the binder resin is preferably 1,000 to 5,000 and is more preferably 1,300 to 3,000. In addition, the weight-average molecular weight (Mw) of the binder resin is preferably 30,000 to 80,000 and is more preferably 45,000 to 60,000.

A charge control agent may be added to the toner. Organometal complex compounds and chelate compounds are effective as charge control agents for negative charging and can be exemplified by monoazo metal complex compounds, acetylacetone-metal complex compounds, and metal complex compounds of aromatic hydroxycarboxylic acids or aromatic dicarboxylic acids. Specific examples of commercial products are Spilon Black TRH, T-77, and T-95 (Hodogaya Chemical Co., Ltd.) and BONTRON (registered trademark) S-34, S-44, S-54, E-84, E-88, and E-89 (Orient Chemical Industries Co., Ltd.).

The toner may contain a crystalline material, e.g., an ester wax, hydrocarbon wax, and so forth, as a release agent. The crystalline material also contributes as a plasticizer to improving the fixing performance. Any known release agent can be used as the release agent.

The following are specific examples of hydrocarbon waxes: mineral oil-based waxes, e.g., paraffin waxes, microcrystalline waxes, and petrolatum, and derivatives thereof; hydrocarbon waxes provided by the Fischer-Tropsch method, and derivatives thereof; and polyolefin waxes, as typified by polyethylene and polypropylene, and derivatives thereof.

Other examples are natural waxes and derivatives thereof, e.g., montan wax and derivatives thereof, carnauba wax, and candelilla wax, and ester waxes in which the main component is a fatty acid ester. In addition to monofunctional ester waxes, multifunctional ester waxes can also be used, most prominently difunctional esters, but also tetrafunctional ester waxes and hexafunctional ester waxes.

Specific examples are diesters between a saturated aliphatic dicarboxylic acid and a saturated aliphatic alcohol, e.g., dibehenyl sebacate, distearyl dodecanedioate, and distearyl octadecanedioate; diesters between a saturated aliphatic diol and a saturated fatty acid, e.g., nonanediol dibehenate and dodecanediol distearate; triesters between a trialcohol and a saturated fatty acid, e.g., glyceryl tribehenate and glyceryl tristearate; and partial esters between a trialcohol and a saturated fatty acid, e.g., glyceryl monobehenate and glyceryl dibehenate.

The release agent is preferably at least one selection from the group consisting of hydrocarbon waxes and ester waxes. In order to optimally maintain the low-temperature fixability, the content of the release agent, per 100 mass parts of the binder resin, is preferably 3 to 20 mass parts and is more preferably 5 to 15 mass parts.

The toner particle preferably comprises a crystalline polyester resin as a plasticizer in order to enhance the fixing performance. Crystalline polyester has a high compatibility with the binder resin and rapidly lowers the viscosity of the toner at low temperatures. An aliphatic diol/aliphatic dicarboxylic acid condensate is preferred for the crystalline polyester resin from the standpoints of crystallization in the binder resin and the plasticizing performance during fixing. The aliphatic diol and aliphatic dicarboxylic acid may be selected from those having 4 to 16 carbons. Doing this facilitates striking a balance between the fixing performance and the storage stability. The content of the crystalline polyester resin, per 100 mass parts of the binder resin, is preferably 1 to 10 mass parts and more preferably 2 to 8 mass parts.

A crystalline polyester resin produced by a known synthesis method can be used as the crystalline polyester resin. For example, synthesis can be carried out by running an esterification reaction or transesterification reaction between the dicarboxylic acid component and diol component, followed by a polycondensation reaction run according to a common method under reduced pressure or with the introduction of nitrogen gas.

A common esterification catalyst or transesterification catalyst, e.g., sulfuric acid, tertiary-butyltitanium butoxide, dibutyltin oxide, manganese acetate, magnesium acetate, and so forth, can be used as necessary in the esterification or transesterification reaction. A common known polymerization catalyst, e.g., tertiary-butyltitanium butoxide, dibutyltin oxide, tin acetate, zinc acetate, tin disulfide, antimony trioxide, germanium dioxide, and so forth, can be used in the polymerization. The polymerization temperature and amount of catalyst are not particularly limited and may be freely selected as necessary.

The toner may comprise a toner particle and an external additive at the toner particle surface. The external additive can be exemplified by known external additives.

The external additive can be exemplified by metal oxide fine particles (inorganic fine particles) such as silica fine particles, alumina fine particles, titania fine particles, zinc oxide fine particles, strontium titanate fine particles, cerium oxide fine particles, and calcium carbonate fine particles.

Other additives may also be used in the toner in small amounts—within a range that substantially does not exercise negative effects—as developing performance enhancers, for example, lubricant powders such as fluororesin powder, zinc stearate powder, and polyvinylidene fluoride powder; abrasives such as cerium oxide powder, silicon carbide powder, and strontium titanate powder; flowability-imparting agents such as titanium oxide powder and aluminum oxide powder; anticaking agents; and reverse polarity organic fine powders and inorganic fine powders. These additives may also be used after the surface of the additive has been hydrophobed.

The weight-average particle diameter (D4) of the toner is preferably 3.0 to 12.0 μm and more preferably 4.0 to 10.0 μm. An excellent flowability and faithful development of the latent image can be obtained when the weight-average particle diameter (D4) is in the indicated range.

In addition, the value of the ratio of the weight-average particle diameter of the toner to the number-average particle diameter of the long diameter of the nonmagnetic inorganic oxide particle A (toner/nonmagnetic inorganic oxide particle A) is preferably 2 to 15, more preferably 2 to 10, and still more preferably 3 to 7. By obeying this range, protrusion formation on the image surface during fixing can be more effectively realized, while keeping to a minimum the impact on properties that affect the electrophotographic properties, e.g., the charging performance and development performance including the fixing performance.

The method for producing the toner is not particularly limited, and known production methods can be used. The toner production method can be exemplified by pulverization methods, polymerization methods, e.g., dispersion polymerization methods, association aggregation methods, dissolution suspension methods, suspension polymerization methods, emulsion aggregation methods, and so forth.

A pulverization method, in which the toner is produced via a melt-kneading step and a pulverization step, is provided in the following as a specific example, but there is no limitation to or by this.

For example, a binder resin, the magnetic iron oxide particle B, and the nonmagnetic inorganic oxide particle A, and optionally a colorant, release agent, charge control agent, and other additives are thoroughly mixed with a mixer such as a Henschel mixer or ball mill (mixing step). The resulting mixture is melt-kneaded using a heated kneader, for example, a twin-screw kneading extruder, hot roll, kneader, or extruder (melt-kneading step).

After cooling and solidification of the resulting melt-kneaded material, the toner particle is obtained by carrying out pulverization using a pulverizer (pulverization step) and carrying out classification using a classifier (classification step). The toner particle may be used as such as a toner. The toner may optionally be obtained by mixing the toner particle with an external additive using a mixer such as a Henschel mixer.

The mixer can be exemplified by the following: FM mixer (Nippon Coke & Engineering Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

The heated kneader can be exemplified by the following: KRC Kneader (Kurimoto, Ltd.); Buss Ko-Kneader (Buss Corp.); TEM extruder (Toshiba Machine Co., Ltd.); TEX twin-screw kneader (The Japan Steel Works, Ltd.); PCM Kneader (Ikegai Ironworks Corporation); three-roll mills, mixing roll mills, and kneaders (Inoue Manufacturing Co., Ltd.); Kneadex (Mitsui Mining Co., Ltd.); Model MS pressure kneader and Kneader-Ruder (Moriyama Mfg. Co., Ltd.); and Banbury mixer (Kobe Steel, Ltd.).

The pulverizer can be exemplified by the following: Counter Jet Mill, Micron Jet, and Inomizer (Hosokawa Micron Corporation); IDS mill and PJM Jet Mill (Nippon Pneumatic Mfg. Co., Ltd.); Cross Jet Mill (Kurimoto, Ltd.); Ulmax (Nisso Engineering Co., Ltd.); SK Jet-O-Mill (Seishin Enterprise Co., Ltd.); Kryptron (Kawasaki Heavy Industries, Ltd.); Turbo Mill (Turbo Kogyo Co., Ltd.); and Super Rotor (Nisshin Engineering Inc.).

The classifier can be exemplified by the following: Classiel, Micron Classifier, and Spedic Classifier (Seishin Enterprise Co., Ltd.); Turbo Classifier (Nisshin Engineering Inc.); Micron Separator, Turboplex (ATP), and TSP Separator (Hosokawa Micron Corporation); Elbow Jet (Nittetsu Mining Co., Ltd.); Dispersion Separator (Nippon Pneumatic Mfg. Co., Ltd.); and YM Microcut (Yasukawa Shoji Co., Ltd.).

In addition, a screening device as follows may be used to screen out the coarse particles: Ultrasonic (Koei Sangyo Co., Ltd.), Rezona Sieve and Gyro-Sifter (Tokuju Corporation), Vibrasonic System (Dalton Co., Ltd.), Soniclean (Sintokogio, Ltd.), Turbo Screener (Turbo Kogyo Co., Ltd.), Microsifter (Makino Mfg. Co., Ltd.), and circular vibrating sieves.

The methods for measuring the individual properties are described in the following.

<Method for Measuring the Softening Point of the Chloroform-Soluble Matter>

The toner particle is obtained by removing the external additive on the toner using the method described above. The toner particle is dissolved in chloroform; the magnetic iron oxide particles are removed using a magnet; and the insoluble matter is separated and removed using a centrifugal separator to obtain a chloroform solution of the toner particle. The chloroform is stripped off with an evaporator, and the chloroform is completely removed using a vacuum dryer to yield the chloroform-soluble matter in the toner particle. 20 mg of the resulting chloroform-soluble matter is converted using 5 kN into a pellet having a diameter of 5 mmφ and a thickness of 1 mm and TMA measurement is performed. The TMA measurement uses a Q400 from TA Instruments, and the measurement is carried out from 30° C. to 150° C. using 0.1 N and a ramp rate condition of 10° C./min and using a probe with a diameter of 2.8 mmφ. Using the obtained displacement curve data, the softening point is taken to be the intersection between the original baseline and the post-displacement tangent (FIG. 1).

<Compositional Analysis and Particle Diameter Measurement for the Magnetic Iron Oxide Particle B>

Measurement of the particle diameter of the magnetic iron oxide particle B is carried out as follows.

The toner particle is obtained by removing the external additive on the toner as described in the preceding. The toner particle is dissolved in chloroform and the magnetic iron oxide particles are recovered using a magnet. The obtained iron oxide particles are heated for 30 minutes at 800° C. using an electric oven to decompose the residual organic component. The residual iron oxide particles are recovered and submitted to scanning electron microscopic (SEM) observation and analysis with an energy-dispersive x-ray analyzer (EDX). Observation is carried out at 10,000× for the observation magnification; particles are confirmed to comprise iron and oxygen (possibly containing trace elements, e.g., trace amounts of Si) by EDX analysis; and the long diameter of these particles is determined using image processing software. 200 particles are measured, the long diameter distribution is elucidated, and the number % of particles present in the 50 to 350 nm range is calculated. In addition, the number-average particle diameter is calculated from the average value of the 200 particles.

SEM: JSM7800, JEOL Ltd.
EDX: Talos F200X Thermo Fisher Scientific Inc.
Image processing software: image analyzer (Luzex AP), Nireco Corporation <Compositional Analysis and Particle Diameter Measurement for the Nonmagnetic Inorganic Oxide Particle A>

The particle diameter of the nonmagnetic inorganic oxide particle A is measured as follows.

The toner particle is obtained by removing the external additive on the toner as described in the preceding. The toner particle is dissolved in chloroform and the magnetic iron oxide particles are removed using a magnet. The chloroform is stripped off using an evaporator, and the obtained solid material is heated for 30 minutes at 800° C. using an electric oven to decompose the residual organic component. The residual nonmagnetic inorganic oxide particles A are recovered and submitted to SEM observation and EDX analysis. Observation is carried out at 10,000× for the observation magnification, and particles are confirmed by EDX analysis to comprise oxygen and at least one element selected from the group consisting of Si, Mg, Al, Ti, and Sr. In addition, these elements are confirmed to be the main component when the peaks for these elements in the EDX spectrum exceed 50 atomic % with respect to the total of the peaks, excluding carbon and oxygen. The long diameter of the confirmed particles is determined using image processing software.

50 particles are measured, the long diameter distribution is elucidated, and, of the particles having a long diameter of at least 100 nm, the number % of particles with a long diameter of 400 nm to 3,000 nm and the number % of particles with a long diameter of 800 nm to 3,000 nm are calculated. In addition, the number-average particle diameter is calculated from the average value of the 50 particles. Confirmation of oxide of at least one element selected from the group consisting of Si, Mg, Al, Ti, and Sr is also performed qualitatively using an x-ray diffraction instrument (XRD).

SEM: JSM7800, JEOL Ltd.
EDX: Talos F200X Thermo Fisher Scientific Inc.
Image processing software: image analyzer (Luzex AP), Nireco Corporation
XRD: RINT-TTR III, Rigaku Corporation <Method for Measuring the Number and Shape Factor of the Nonmagnetic Inorganic Oxide Particle a and Magnetic Iron Oxide Particle B>

At the time point prior to execution of the external addition step, the nonmagnetic inorganic oxide particle A and the magnetic iron oxide particle B are internally added particles incorporated in the toner particle. The externally added particles can be removed by the method described above. The number of nonmagnetic inorganic oxide particles A and the number of magnetic iron oxide particles B indicates the number calculated based on an image of the toner particle cross section provided by observation with a transmission electron microscope (TEM), and calculation of the shape factor is also performed based on this image. The image of the toner particle cross section obtained with a transmission electron microscope (TEM) is prepared as follows.

Using an osmium plasma coater (OPC80T, Filgen, Inc.), an Os film (5 nm) and a naphthalene film (20 nm) are executed on the toner as protective films. After embedding with D800 photocurable resin (JEOL Ltd.), toner particle cross sections with a film thickness of 60 nm (or 70 nm) are prepared using an ultrasound ultramicrotome (UC7, Leica) and a slicing rate of 1 mm/s.

The resulting cross section is subjected to STEM observation using the STEM function of a TEM (JEM 2800, JEOL Ltd.). Acquisition is performed at a STEM probe size of 1 nm and an image size of 1024×1024 pixels. Of the toner particle cross sections, cross sections are selected that have a diameter that is 0.9× to 1.1× of the weight-average particle diameter.

The resulting image is analyzed by input into image processing software in an image analyzer (Luzex AP) from Nireco Corporation, and the number and shape factor of the nonmagnetic inorganic oxide particles A and the magnetic iron oxide particles B are calculated. The shape factor SF1 is the value obtained by calculation using the following formula (1).

$$SF1=(L^2/A)\times(\pi/4)\times 100 \quad (1)$$

In the formula, L represents the absolute maximum length of the particle (length of circumscribing circle), and A represents the projected area of the particle.

The number and shape factor are calculated by observing and analyzing the cross sections of 100 toner particles. The arithmetic average values are used in each case for the shape factor, number of nonmagnetic inorganic oxide particles A per 1 toner, and number of magnetic iron oxide particles B per 1 toner. EDX analysis may be used to differentiate between nonmagnetic inorganic oxide particles A and magnetic iron oxide particles B.

<Measurement of the Weight-Average Particle Diameter (D4) and the Number-Average Particle Diameter (D1) of the Toner (Particle)>

The weight-average particle diameter (D4) and the number-average particle diameter (D1) of the toner (particle) are determined by carrying out the measurements in 25,000 channels for the number of effective measurement channels and performing analysis of the measurement data using a "Coulter Counter Multisizer 3" (registered trademark, Beckman Coulter, Inc.), a precision particle size distribution measurement instrument operating on the pore electrical resistance method and equipped with a 100-µm aperture tube, and using the accompanying dedicated software, i.e., "Beckman Coulter Multisizer 3 Version 3.51" (Beckman Coulter, Inc.) to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis.

In the "modify the standard operating method (SOM)" screen in the dedicated software, the total count number in the control mode is set to 50,000 particles; the number of measurements is set to 1 time; and the Kd value is set to the value obtained using "standard particle 10.0 µm" (Beckman Coulter, Inc.). The threshold value and noise level are automatically set by pressing the threshold value/noise level measurement button. In addition, the current is set to 1600 µA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 µm to 60 µm.

The specific measurement procedure is as follows.

(1) Approximately 200 mL of the above-described aqueous electrolyte solution is introduced into a 250-mL round-bottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker, and to this is added as dispersing agent approximately 0.3 mL of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

(3) A prescribed amount of deionized water is introduced into the water tank of an "Ultrasonic Dispersion System Tetora 150" (Nikkaki Bios Co., Ltd.), an ultrasound disperser having an electrical output of 120 W and equipped with two oscillators (oscillation frequency=50 kHz) disposed such that the phases are displaced by 180°, and approximately 2 mL of Contaminon N is added to the water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner (particle) is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner (particle)-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50,000.

(7) The measurement data is analyzed by the previously cited dedicated software provided with the instrument and the weight-average particle diameter (D4) is calculated. When set to graph/volume % with the dedicated software, the "average diameter" on the analysis/volumetric statistical value (arithmetic average) screen is the weight-average particle diameter (D4), and when set to graph/number % with the dedicated software, the "average diameter" on the "analysis/numerical statistical value (arithmetic average)" screen is the number-average particle diameter (D1).

<Compositional Analysis of the Binder Resin>
Method for Separating the Binder Resin 100 mg of toner is dissolved in 3 mL of chloroform. The insoluble matter is then removed by suction filtration using a syringe fitted with a sample treatment filter (pore size of from 0.2 μm to 0.5 μm, for example, an H-25-2 Sample Pretreatment Cartridge (Tosoh Corporation) is used). The soluble matter is introduced onto a preparative HPLC (instrument: LC-9103 NEXT, Japan Analytical Industry Co., Ltd., preparative column [60 cm], exclusion limits: 20,000, 70,000, two column train), and transport of the chloroform eluent is carried out. Once the peaks can be confirmed by display of the resulting chromatograph, the retention time providing a molecular weight of at least 2,000 as a monodisperse polystyrene reference material is fractionated. The solution of the resulting fraction is dried and solidified to provide the binder resin.

Component Identification and Weight Ratio Measurement for the Binder Resin Using Nuclear Magnetic Resonance Spectroscopy (NMR)

1 mL of deuterochloroform is added to 20 mg of the toner and the proton NMR spectrum of the dissolved binder resin is measured. The molar ratio and mass ratio for each monomer are calculated from the resulting NMR spectrum and the content of the constituent monomer units of the binder resin, e.g., noncrystalline polyester resin, can then be determined. For example, in the case of styrene-acrylic copolymer, the compositional ratio and mass ratio can be calculated based on the peak in the vicinity of 6.5 ppm that originates with the styrene monomer and the peak originating with the acrylic monomer in the vicinity of 3.5 to 4.0 ppm. In the case of a polyester resin and styrene-acrylic resin copolymer, the molar ratio and weight ratio are calculated using peaks originating with each of the monomers constituting the polyester resin as well as peaks originating with the styrene-acrylic copolymer, and the content of the monomer units in the polyester resin is then determined.

NMR instrument: RESONANCE ECX500, JEOL Ltd.
Measurement nucleus: proton
Measurement mode: single pulse
Reference peak: TMS <Measurement of the σr and Amount of Si for the Magnetic Iron Oxide Particle B>

Measurement of the σr and amount of Si for the magnetic iron oxide particle B is carried out as follows.

The external additive on the toner is removed using the method described in the preceding to obtain toner particles. The toner particles are dissolved in chloroform and the magnetic iron oxide particles B are collected using a magnet. The magnetic iron oxide particles B are cleaned by carrying out the following process three times: immersion of the obtained iron oxide particles B in chloroform and collection with a magnet.

Using the obtained magnetic iron oxide particles B and a VSM P-1-10 (Toei Industry Co., Ltd.) vibrating magnetometer, the σr of the magnetic iron oxide particle B is measured at an external magnetic field of 795.8 kA/m and a room temperature of 25° C. In addition, 200 mg of the obtained magnetic iron oxide particle B is introduced into a cup for liquid sample measurement in fluorescent x-ray measurement and is uniformly spread over the entire bottom surface. The amount of Si in the iron oxide is quantitated by the fundamental parameter method in an He atmosphere using an Axios (PANalytical) fluorescent x-ray analyzer and the "SuperQ ver. 4.0F" (PANalytical) software provided with the instrument.

<Measurement of the Weight-Average Molecular Weight Mw and Number-Average Molecular Weight Mn of the Binder Resin>

The molecular weight distribution of the binder resin (weight-average molecular weight Mw, number-average molecular weight Mn) is measured as follows using gel permeation chromatography (GPC).

First, the sample is dissolved in tetrahydrofuran (THF) at room temperature for 24 hours. The obtained solution is filtered using a "Sample Pretreatment Cartridge" (Tosoh Corporation) solvent-resistant membrane filter having a pore diameter of 0.2 μm to obtain a sample solution. The sample solution is adjusted to a concentration of THF-soluble component of 0.8 mass %. Measurement is carried out under the following conditions using this sample solution.

instrument: HLC8120 GPC (detector: RI) (Tosoh Corporation)
column: 7-column train of Shodex KF-801, 802, 803, 804, 805, 806, and 807 (Showa Denko Kabushiki Kaisha)
eluent: tetrahydrofuran (THF)
flow rate: 1.0 mL/min
oven temperature: 40.0° C.
sample injection amount: 0.10 mL A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

EXAMPLES

The present invention is more specifically described in the following using production examples and examples, but the present invention is in no way limited to or by these. The number of parts in the following compositions are mass parts in all instances.

<Nonmagnetic Inorganic Oxide Particle A1 Production Example>

The atmosphere in a reaction vessel was substituted by introducing a mixed gas of argon and oxygen in a volume ratio of 3:1. Oxygen gas was fed into this reaction vessel at 40 m$^3$/hr and hydrogen gas was fed at 20 m$^3$/hr, and an oxygen-hydrogen combustion flame was formed using an igniter. A dust cloud was then formed by the introduction into this combustion flame of a starting silicon metal powder using a hydrogen carrier gas with a pressure of 147 kPa (1.5 kg/cm$^2$). This dust cloud was ignited by the combustion flame and an oxidation reaction was produced by the dust explosion. After the oxidation reaction, the interior of the reaction vessel was cooled to yield a silica powder having a number-average particle diameter of 2.67 μm.

This silica powder was pulverized using a Pulverizer (Hosokawa Micron Corporation) to yield a nonmagnetic inorganic oxide particle A1 having a number-average particle diameter of 1,520 nm.

<Nonmagnetic Inorganic Oxide Particles A4, A5, and A11 Production Example>

Nonmagnetic inorganic oxide particles A4, A5, and A11 were obtained in accordance with the silica particle 1 production example, by carrying out pulverization with adjustment of the pulverization force at the Pulverizer.

<Nonmagnetic Inorganic Oxide Particles A2, A3, A6, and A12 Production Example>

The atmosphere in a reaction vessel was substituted by introducing a mixed gas of argon and oxygen in a volume ratio of 3:1. Oxygen gas was fed into this reaction vessel at 40 m³/hr and hydrogen gas was fed at 20 m³/hr, and an oxygen-hydrogen combustion flame was formed using an ignitor. A dust cloud was then formed by the introduction into this combustion flame of a starting silicon metal powder using a hydrogen carrier gas with a pressure of 0.5 kg/cm². An oxidation reaction was produced by a dust explosion generated by the ignition of this dust cloud by the combustion flame. After the oxidation reaction, the interior of the reaction vessel was cooled to yield a silica powder having a number-average particle diameter of 3.44 µm.

Nonmagnetic inorganic oxide particles A2, A3, and A6 were obtained by pulverizing this silica powder with adjustment of the pulverization force at the Pulverizer. The silica powder on which pulverization with the Pulverizer was not performed was designated nonmagnetic inorganic oxide particle A12.

<Nonmagnetic Inorganic Oxide Particle A7 Production Example>

Ilmenite ore was dried and crushed and was digested/extracted by treatment with concentrated sulfuric acid. After the removal of the unreacted ore, the iron sulfate was decrystallized. The pH was brought to 9.0 by the addition of an aqueous sodium hydroxide solution to the resulting titanyl sulfate and a desulfurization treatment was performed, after which neutralization to pH 5.8 was carried out using hydrochloric acid and filtration and washing with water were performed. After baking in a heating oven, pulverization was performed while adjusting the pulverization force with the Pulverizer to yield a titanium oxide designated as nonmagnetic inorganic oxide particle A7.

<Nonmagnetic Inorganic Oxide Particle A8 Production Example>

Magnesium oxide powder (Pyrokisuma 3320, Kyowa Chemical Industry Co., Ltd.) was pulverized using the Pulverizer while adjusting the pulverization force to obtain a magnesium oxide particle designated as nonmagnetic inorganic oxide particle A8.

<Nonmagnetic Inorganic Oxide Particle A9 Production Example>

Aluminum oxide was obtained by refining a bauxite starting material using the Bayer method. Sodium hydroxide was added to the bauxite and thermal decomposition was carried out at 250° C. After the removal of insoluble matter by filtration, aluminum hydroxide was recovered as a solid by cooling. This aluminum hydroxide was thermally dehydrated at 1050° C. to obtain aluminum oxide. Pulverizing with a Pulverizer while adjusting the pulverization force then yielded an aluminum oxide particle designated as nonmagnetic inorganic oxide particle A9.

<Nonmagnetic Inorganic Oxide Particle A10 Production Example>

Ilmenite ore was dried and crushed and was digested/extracted by treatment with concentrated sulfuric acid. After the removal of the unreacted ore, the iron sulfate was decrystallized. The pH was brought to 9.0 by the addition of an aqueous sodium hydroxide solution to the resulting titanyl sulfate and a desulfurization treatment was performed, after which neutralization to pH 5.8 was carried out using hydrochloric acid and filtration and washing with water were performed. Water was added to the washed cake to make a slurry having 1.5 mol/L as $TiO_2$, and hydrochloric acid was added to bring the pH to 1.5 and carry out a deflocculation treatment. The desulfurized/deflocculated metatitanic acid was collected as $TiO_2$ and was introduced into a 3-L reaction vessel. An aqueous strontium chloride solution was added to this deflocculated metatitanic acid slurry so as to bring the $SrO/TiO_2$ molar ratio to 1.18, after which the $TiO_2$ concentration was adjusted to 0.9 mol/L.

Then, after heating to 90° C. while stirring and mixing, 444 mL of a 10 mol/L aqueous sodium hydroxide solution was added over 50 minutes while microbubbling with nitrogen gas at 600 mL/min; this was followed by stirring for 1 hour at 95° C. while microbubbling with nitrogen gas at 400 mL/min. The reaction slurry was then quenched to 12° C. while stirring and injecting 10° C. cooling water into the jacket of the reaction vessel; neutralization was performed by the addition of hydrochloric acid with stirring for 1 hour; and filtration and separation were subsequently carried out. After baking in a heating oven, pulverization was carried out with a Pulverizer while adjusting the pulverization force to yield a strontium titanate designated as nonmagnetic inorganic oxide particle A10.

TABLE 1

| Nonmagnetic inorganic oxide particle No. | Component | Number-average particle diameter (D1) | Proportion of particles with long diameter of 400 nm to 3,000 nm | Proportion of particles with long diameter of 800 nm to 3,000 nm | SF1 |
|---|---|---|---|---|---|
| A1 | SiO2 | 1520 nm | 95% | 90% | 150 |
| A2 | SiO2 | 2480 nm | 85% | 85% | 145 |
| A3 | SiO2 | 2680 nm | 79% | 78% | 160 |
| A4 | SiO2 | 610 nm | 75% | 40% | 155 |
| A5 | SiO2 | 550 nm | 72% | 38% | 130 |
| A6 | SiO2 | 2710 nm | 72% | 72% | 130 |
| A7 | TiO2 | 500 nm | 73% | 35% | 135 |
| A8 | MgO | 510 nm | 72% | 36% | 132 |
| A9 | Al2O3 | 520 nm | 70% | 35% | 130 |
| A10 | SrTiO3 | 600 nm | 75% | 41% | 138 |
| A11 | SiO2 | 250 nm | 30% | 20% | 145 |
| A12 | SiO2 | 3440 nm | 65% | 65% | 142 |

<Magnetic Iron Oxide Particle B1 Production Example>

An aqueous solution containing ferrous hydroxide was prepared by mixing the following into an aqueous ferrous sulfate solution: a sodium hydroxide solution at 1.00 to 1.10 equivalents with reference to the element iron, P2O5 in an amount that provided 0.15 mass % as the element phosphorus with reference to the element iron, and $SiO_2$ in an amount that provided 1.50 mass % as the element silicon with reference to the element iron. The pH of the aqueous solution was brought to 8.0 and an oxidation reaction was run at 85° C. while bubbling in air to prepare a seed crystal-containing slurry.

An aqueous ferrous sulfate solution was then added to the slurry so as to provide from 0.90 to 1.20 equivalents with reference to the initial amount of alkali (sodium component in the sodium hydroxide solution), after which the slurry was held at pH 7.6 and an oxidation reaction was run while bubbling in air to obtain an iron oxide-containing slurry. The produced magnetic iron oxide particles were filtered on a filter press and washed with a large amount of water and then dried for 2 hours at 120° C.; the resulting particles were crushed to yield magnetic iron oxide particle B1 having a volume-average particle diameter of 150 nm. This magnetic iron oxide particle B1 had a spherical shape.

<Magnetic Iron Oxide Particles B2 to B6 Production Example>

The magnetic iron oxide particles B2 to B6 shown in Table 2 were obtained in accordance with the Magnetic Iron Oxide Particle B1 Production Example, but using 0.3 mass % for the amount of $SiO_2$ that is mixed and adjusting the oxidation reaction at 85° C. and the holding time at pH 7.6.

TABLE 2

| Magnetic iron oxide particle No. | Number-average particle diameter (D1) | Proportion of particles with long diameter of 50 to 350 nm | SF1 | Si amount (%) | σr (Am²/kg) |
|---|---|---|---|---|---|
| B1 | 150 nm | 80% | 105 | 1.5 | 8 |
| B2 | 150 nm | 80% | 105 | 0.3 | 16 |
| B3 | 102 nm | 82% | 110 | 0.3 | 18 |
| B4 | 299 nm | 72% | 104 | 0.3 | 14 |
| B5 | 100 nm | 83% | 120 | 0.3 | 20 |
| B6 | 360 nm | 52% | 105 | 0.3 | 12 |

<Binder Resin>

Table 3 shows the materials used as binder resins in the examples that follow.

TABLE 3

| Binder resin | Component summary | Molecular weight (Mw) | Molecular weight (Mn) |
|---|---|---|---|
| A-1 | Amorphous polyester resin | 53000 | 1800 |
| A-2 | StAc-PES hybrid resin (PES fraction 40%) | 58000 | 2300 |
| A-3 | Styrene-acrylic resin | 47000 | 2000 |
| A-4 | Amorphous polyester resin | 61000 | 5300 |

The composition of binder resin A-4 is as follows.
binder resin A-4: different molecular weight from binder resin A-1
([polyoxypropylene(2.2)-2,2-bis(4-hydroxyphenyl)propane:polyoxyethylene(2.2)-2,2-bis(4-hydroxyphenyl)propane:terephthalic acid:trimellitic acid=80:20:85:15])

Toner 1 Production Example
binder resin A-1: 100.0 parts
([polyoxypropylene(2.2)-2,2-bis(4-hydroxyphenyl)propane:polyoxyethylene(2.2)-2,2-bis(4-hydroxyphenyl)propane:terephthalic acid:trimellitic acid=80:20:85:15])
paraffin wax (HNP9: Nippon Seiro Co., Ltd.): 6.0 parts
nonmagnetic inorganic oxide particle A1: 2.0 parts
iron complex of monoazo dye (T-77, Hodogaya Chemical Co., Ltd.): 2.0 parts
magnetic iron oxide particle B1: 100 parts
crystalline polyester resin A: 5 parts
(1:1 condensate of sebacic acid and dodecanediol)

These materials were mixed using a Henschel mixer (Model FM-75, Mitsui Mining Co., Ltd.) at a rotation rate of 20 s$^{-1}$ and a rotation time of 5 minutes, followed by kneading using a twin-screw kneader (Model PCM-30, Ikegai Corporation) set to a temperature of 130° C. The resulting kneaded material was cooled to 25° C. and coarsely pulverized to 1 mm and below using a hammer mill to obtain a coarsely pulverized material. The resulting coarsely pulverized material was finely pulverized using a mechanical pulverizer (T-250, Turbo Kogyo Co., Ltd.). Classification was carried out using a Coanda effect-based multi-grade classifier to obtain a toner particle 1 having a weight-average particle diameter (D4) of 7.5 μm.

A toner mixture was obtained by mixing 100 parts of the obtained toner particles with 1.5 parts of hydrophobed silica fine particles having a number-average primary particle diameter of 10 nm; mixing was carried out for 5 minutes using a Henschel mixer (Mitsui Mining Co., Ltd.) at a rotation rate condition of 3,000 rpm.

The coarse particles were subsequently removed using a 300-mesh sieve (aperture of 48 μm) to yield toner 1. Toner 1 had a weight-average particle diameter of 7.5 μm. The formulation for toner 1 is given in Table 4.

TABLE 4

| Toner No. | Binder resin A No. | Parts | Magnetic iron oxide particle B No. | Parts | Nonmagnetic inorganic oxide particle A No. | Parts | WAX Type | Parts | Crystalline polyester A |
|---|---|---|---|---|---|---|---|---|---|
| 1 | Binder resin A-1 | 100 | Iron oxide B1 | 100 | Oxide A1 | 2.0 | HNP9 | 6.0 | Yes |
| 2 | Binder resin A-1 | 100 | Iron oxide B2 | 100 | Oxide A1 | 2.0 | HNP9 | 6.0 | Yes |
| 3 | Binder resin A-1 | 100 | Iron oxide B3 | 100 | Oxide A1 | 2.0 | Behenyl stearate | 6.0 | No |
| 4 | Binder resin A-2 | 100 | Iron oxide B4 | 100 | Oxide A2 | 2.0 | Behenyl stearate | 6.0 | No |
| 5 | Binder resin A-3 | 100 | Iron oxide B3 | 100 | Oxide A2 | 2.0 | Behenyl stearate | 6.0 | No |
| 6 | Binder resin A-3 | 100 | Iron oxide B2 | 100 | Oxide A3 | 2.0 | Behenyl stearate | 6.0 | No |
| 7 | Binder resin A-3 | 100 | Iron oxide B3 | 100 | Oxide A4 | 2.0 | Behenyl stearate | 6.0 | No |

TABLE 4-continued

| Toner No. | Binder resin A No. | Parts | Magnetic iron oxide particle B No. | Parts | Nonmagnetic inorganic oxide particle A No. | Parts | WAX Type | Parts | Crystalline polyester A |
|---|---|---|---|---|---|---|---|---|---|
| 8 | Binder resin A-3 | 100 | Iron oxide B3 | 100 | Oxide A4 | 2.0 | Behenyl stearate | 6.0 | No |
| 9 | Binder resin A-3 | 100 | Iron oxide B5 | 100 | Oxide A5 | 2.0 | Behenyl stearate | 6.0 | No |
| 10 | Binder resin A-3 | 100 | Iron oxide B5 | 100 | Oxide A5 | 2.5 | Behenyl stearate | 6.0 | No |
| 11 | Binder resin A-3 | 100 | Iron oxide B5 | 100 | Oxide A6 | 1.0 | Behenyl stearate | 6.0 | No |
| 12 | Binder resin A-3 | 100 | Iron oxide B5 | 90 | Oxide A5 | 2.5 | Behenyl stearate | 6.0 | No |
| 13 | Binder resin A-3 | 100 | Iron oxide B5 | 110 | Oxide A6 | 1.0 | Behenyl stearate | 6.0 | No |
| 14 | Binder resin A-3 | 100 | Iron oxide B5 | 90 | Oxide A7 | 1.4 | Behenyl stearate | 6.0 | No |
| 15 | Binder resin A-3 | 100 | Iron oxide B5 | 90 | Oxide A8 | 2.9 | Behenyl stearate | 6.0 | No |
| 16 | Binder resin A-3 | 100 | Iron oxide B5 | 90 | Oxide A9 | 2.2 | Behenyl stearate | 6.0 | No |
| 17 | Binder resin A-3 | 100 | Iron oxide B5 | 90 | Oxide A10 | 2.0 | Behenyl stearate | 6.0 | No |
| 18 | Binder resin A-3 | 100 | Iron oxide B5 | 90 | Oxide A10 | 2.0 | Behenyl stearate | 2.0 | No |
| 19 | Binder resin A-1 | 100 | Iron oxide B1 | 100 | None | — | HNP9 | 6.0 | Yes |
| 20 | Binder resin A-3 | 100 | Iron oxide B1 | 100 | Oxide A1 | 2.0 | HNP9 | 6.0 | No |
| 21 | Binder resin A-1 | 100 | Iron oxide B1 | 100 | Oxide A11 | 2.0 | HNP9 | 6.0 | Yes |
| 22 | Binder resin A-1 | 100 | Iron oxide B1 | 100 | Oxide A12 | 2.0 | HNP9 | 6.0 | Yes |
| 23 | Binder resin A-1 | 100 | Iron oxide B6 | 100 | Oxide A1 | 2.0 | HNP9 | 6.0 | Yes |
| 24 | Binder resin A-4 | 100 | Iron oxide B1 | 100 | Oxide A1 | 2.0 | HNP9 | 6.0 | No |
| 25 | Binder resin A-1 | 100 | Iron oxide B3 | 100 | Oxide A12 | 2.0 | HNP9 | 6.0 | Yes |

<Toner 2 Production Example>

Toner 2 was obtained proceeding as for the production of toner 1, but changing the following in the Toner 1 Production Example: the magnetic iron oxide particle B1 was changed to magnetic iron oxide particle B2, and the type of material and number of parts were changed as indicated in Table 4.

<Toner 3 Production Example>

Toner 3 was obtained proceeding as for the production of toner 1, but changing the following in the Toner 1 Production Example: the crystalline polyester resin A was not added, behenyl stearate was used for the wax, and the type of material and number of parts were changed as indicated in Table 4.

<Toner 4 Production Example>

Toner 4 was obtained proceeding as for the production of toner 3, but changing the following in the Toner 3 Production Example: the binder resin A-1 was changed to the binder resin A-2 having the composition given below, and the type of material and number of parts were changed as indicated in Table 4.

binder resin A-2: styrene-acrylic resin-polyester resin hybrid resin (mass ratio: styrene-acrylic resin/polyester resin=60/40)

(mass ratio [polyoxypropylene(2.2)-2,2-bis(4-hydroxyphenyl)propane:polyoxyethylene(2.2)-2,2-bis(4-hydroxyphenyl)propane:terephthalic acid:trimellitic acid: acrylic acid=90:10:92:3:10, styrene:butyl acrylate=90: 40])

Toners 5 to 18 Production Example

Toners 5 to 18 were obtained proceeding as for the production of toner 4, but changing the following in the Toner 3 Production Example: the binder resin A-2 was changed to the binder resin A-3 having the composition given below, and the type of material and number of parts were changed as indicated in Table 4. The weight-average particle diameter was controlled as appropriate to the values in Table 5 by adjustment of the micropulverization force and the classification conditions.

binder resin A-3: styrene-acrylic resin (mass ratio styrene:n-butyl acrylate=78:22)

Comparative Examples

<Toners 19 to 25 Production Example>

Toners 19 to 25 were obtained proceeding as for the production of toner 1, but changing the following in the Toner 1 Production Example: the type of material and number of parts were changed as indicated in Table 4.

The properties of the obtained toners are given in Table 5.

TABLE 5

| Toner No. | Particle diameter μm | Softening point of chloroform-soluble matter (° C.) | A/B average diameter ratio | B/A number ratio | Number of nonmagnetic inorganic oxide particles A (in one toner) | Number of magnetic iron oxide particles B (in one toner) | Toner/A average diameter ratio | A number % | B number % |
|---|---|---|---|---|---|---|---|---|---|
| 1 | 7.5 | 65 | 10 | 250 | 1.0 | 250 | 5 | 92% | 78% |
| 2 | 7.5 | 65 | 10 | 250 | 1.0 | 250 | 5 | 93% | 83% |
| 3 | 7.5 | 72 | 15 | 350 | 1.0 | 350 | 5 | 92% | 82% |
| 4 | 7.5 | 82 | 8 | 150 | 1.0 | 150 | 3 | 83% | 72% |
| 5 | 7.5 | 73 | 24 | 440 | 0.7 | 308 | 3 | 85% | 82% |
| 6 | 6.8 | 73 | 18 | 312 | 0.5 | 156 | 3 | 75% | 76% |
| 7 | 9.0 | 73 | 6 | 70 | 5.0 | 350 | 15 | 72% | 84% |
| 8 | 9.3 | 73 | 6 | 70 | 5.0 | 350 | 16 | 77% | 82% |
| 9 | 9.3 | 73 | 6 | 70 | 5.0 | 350 | 17 | 72% | 80% |
| 10 | 9.3 | 73 | 6 | 50 | 6.0 | 300 | 17 | 74% | 83% |
| 11 | 6.6 | 73 | 27 | 350 | 0.4 | 140 | 2 | 72% | 82% |
| 12 | 9.3 | 73 | 6 | 43 | 6.0 | 258 | 17 | 71% | 85% |
| 13 | 6.6 | 73 | 27 | 510 | 0.4 | 204 | 2 | 71% | 80% |
| 14 | 9.3 | 73 | 5 | 48 | 5.5 | 264 | 19 | 72% | 82% |
| 15 | 9.3 | 73 | 5 | 42 | 6.2 | 260 | 18 | 74% | 83% |
| 16 | 9.3 | 73 | 5 | 48 | 5.5 | 264 | 18 | 70% | 81% |
| 17 | 9.3 | 89 | 6 | 43 | 5.8 | 249 | 16 | 75% | 83% |
| 18 | 9.3 | 73 | 6 | 43 | 5.8 | 249 | 16 | 75% | 81% |
| 19 | 7.5 | 65 | — | — | — | — | — | — | 82% |
| 20 | 7.5 | 92 | 10 | 250 | 1.0 | 250 | 5 | 92% | 79% |
| 21 | 7.5 | 65 | 2 | 25 | 11.0 | 275 | 30 | 30% | 80% |
| 22 | 7.5 | 65 | 23 | 350 | 0.4 | 140 | 2 | 63% | 77% |
| 23 | 7.5 | 65 | 4 | 130 | 1.0 | 130 | 5 | 93% | 52% |
| 24 | 7.5 | 95 | 10 | 250 | 1.0 | 250 | 5 | 95% | 80% |
| 25 | 7.5 | 65 | 34 | 500 | 0.7 | 350 | 2 | 64% | 80% |

The particle diameter in the table is the weight-average particle diameter (D4). The "A/B average diameter ratio" is the value of the ratio of the number-average particle diameter of the long diameter for the nonmagnetic inorganic oxide particle A to the number-average particle diameter of the long diameter for the magnetic iron oxide particle B. The "B/A number ratio" is the value of the ratio of the number of the magnetic iron oxide particles B contained in the toner particle cross section with respect to the number of non-magnetic inorganic oxide particles A contained in the toner particle cross section. The "toner/A average diameter ratio" is the value of the ratio of the weight-average particle diameter of the toner to the number-average particle diameter of the long diameter of the nonmagnetic inorganic oxide particle A. The A number % is the "proportion, among nonmagnetic inorganic oxide particles A having a long diameter of at least 100 nm, of particles having a long diameter of from 400 nm to 3,000 nm", and the B number % is the "proportion, among the magnetic iron oxide particles B, of particles having a long diameter of from 50 nm to 350 nm".

<Evaluation of the Rubbing Fixing Performance>

In pursuit of an evaluation of the fixing performance in a high-speed machine, an evaluation of the rubbing fixing performance was carried out using an HP LaserJet Enterprise M609dn with its process speed modified to 500 mm/sec and with the fixation temperature control reduced by 25° C. from the setting.

The rubbing fixing performance was evaluated using the degree of staining of a lens-cleaning paper (Silbon Paper, Nikon) pre-versus-post-rubbing with the lens-cleaning paper of a solid black image output in a normal-temperature, normal-humidity environment. OCE RED LABEL (areal weight: 80 g/m²) was used as the paper.

The evaluation was performed based on the density of staining of the lens-cleaning paper (Silbon Paper, Nikon) after the fixed image was rubbed with 10 back-and-forth excursions using the lens-cleaning paper under a load of 100 g/cm². Using a MacBeth reflection densitometer (MacBeth Corporation), the staining was evaluated using the numerical value of the density difference of the stained region with prior to use, and a score of A to C was considered to be good. The results of the evaluation are given in Table 6.

A: density difference is 0 to 0.02
B: density difference is 0.03 to 0.05
C: density difference is 0.06 to 0.09
D: density difference is greater than or equal to 0.10

<Evaluation of the General-Purpose Paper Gloss>

In pursuit of an evaluation of printing in a high-speed machine, an evaluation of the gloss was carried out using an HP LaserJet Enterprise M609dn with its process speed modified to 500 mm/sec and with the fixation temperature control reduced by 25° C. from the setting.

OCE RED LABEL (areal weight: 80 g/m²) was used as the paper, and an image (toner laid-on level: 0.6 mg/cm²) of 9 squares (20×20 mm) aligned in 3 rows and 3 levels was printed out. The gloss of this image was measured using an angle of light incidence condition of 75° and using a Glossmeter PG-3D handheld glossmeter (Tokyo Denshoku Co., Ltd.), and the average gloss value of the 9 squares was determined.

A higher gloss value indicates an image having a smoother, glossier image surface, while a lower gloss value indicates a matte image with a cooler impression.

A: gloss less than 15
B: gloss of at least 15 but less than 25
C: gloss of at least 25 but less than 35
D: gloss of at least 35 but less than 40
E: gloss greater than or equal to 40

<Evaluation of the Glossy Paper Gloss>

When a glossy paper having a smooth surface is used, this facilitates an increase in the fixing gloss and facilitates a reduction in black image quality, and thus in particular enables a rigorous evaluation.

In pursuit of an evaluation of printing in a high-speed machine, an evaluation of the gloss was carried out using an HP LaserJet Enterprise M609dn with its process speed modified to 500 mm/sec and with the fixation temperature control reduced by 50° C. from the setting.

Image Coat Gloss 100 glossy paper (areal weight: 100 g/m², Canon Marketing Japan Inc.) was used as the paper, and an image (toner laid-on level: 0.6 mg/cm²) of 9 squares (20×20 mm) aligned in 3 rows and 3 levels was printed out. The gloss of this image was measured using an angle of light incidence condition of 75° and using a Glossmeter PG-3D handheld glossmeter (Tokyo Denshoku Co., Ltd.), and the average gloss value of the 9 squares was determined.

A: gloss less than 20
B: gloss of at least 20 but less than 30
C: gloss of at least 30 but less than 40
D: gloss of at least 40 but less than 50
E: gloss greater than or equal to 50

TABLE 6

| | | Glossy paper gloss | General-purpose paper gloss | Evaluation of fixing performance |
|---|---|---|---|---|
| Example 1 | Toner 1 | A | A | A |
| Example 2 | Toner 2 | A | A | B |
| Example 3 | Toner 3 | A | A | B |
| Example 4 | Toner 4 | A | A | B |
| Example 5 | Toner 5 | B | A | B |
| Example 6 | Toner 6 | B | A | C |
| Example 7 | Toner 7 | B | B | B |
| Example 8 | Toner 8 | B | B | B |
| Example 9 | Toner 9 | C | B | B |
| Example 10 | Toner 10 | C | B | B |
| Example 11 | Toner 11 | C | B | B |
| Example 12 | Toner 12 | D | C | B |
| Example 13 | Toner 13 | D | C | C |
| Example 14 | Toner 14 | D | D | B |
| Example 15 | Toner 15 | D | D | B |
| Example 16 | Toner 16 | D | D | B |
| Example 17 | Toner 17 | D | D | B |
| Example 18 | Toner 18 | D | D | D |
| Comparative Example 1 | Toner 19 | E | E | A |
| Comparative Example 2 | Toner 20 | A | A | E |
| Comparative Example 3 | Toner 21 | E | C | C |
| Comparative Example 4 | Toner 22 | D | B | E |
| Comparative Example 5 | Toner 23 | E | D | B |
| Comparative Example 6 | Toner 24 | A | A | E |
| Comparative Example 7 | Toner 25 | E | D | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110966, filed Jul. 2, 2021, which is hereby incorporated by reference herein in its entirety.

What is claimed is:

1. A toner, comprising:
a toner particle comprising a binder resin, a nonmagnetic inorganic oxide particle A, and a magnetic iron oxide particle B;
a softening point of a chloroform-soluble component of the toner particle being not greater than 90° C.;
the nonmagnetic inorganic oxide particle A and the magnetic iron oxide particle B being internally added to the toner particle; and
the nonmagnetic inorganic oxide particle A being a silica particle, wherein
when a cross section of the toner particle provided by sectioning with a microtome is observed with transmission electron microscopy (i) a particle number of the nonmagnetic inorganic oxide particle A that is present per 1 toner particle cross section is 0.7 to 5.0, and (ii) a shape factor SF1 of the nonmagnetic inorganic oxide particle A is at least 143, where SF1 of the nonmagnetic inorganic oxide particle $A=((LA)^2/(AA))\times(\pi/4)\times 100$ when LA represents the absolute maximum length of the nonmagnetic inorganic oxide particle A (length of circumscribing circle) and AA represents the projected area of the nonmagnetic inorganic oxide particle A, and (iii) a shape factor SF1 of the magnetic iron oxide particle B is not more than 110, where SF1 of the magnetic iron oxide particle $B=(LB)^2/(AB)\times(\pi/4)\times 100$ when LB represents the absolute maximum length of the magnetic iron oxide particle B (length of circumscribing circle) and AB represents the projected area of the magnetic iron oxide particle B,
at least 70 number % of the nonmagnetic inorganic oxide particles A having a long diameter of at least 100 nm have a long diameter of 400 to 3,000 nm,
at least 70 number % of the magnetic iron oxide particles B have a long diameter of 50 to 350 nm, and
a value of a ratio of a number-average particle diameter of the long diameter for the nonmagnetic inorganic oxide particle A to a number-average particle diameter of the long diameter for the magnetic iron oxide particle B is 5 to 30.

2. The toner according to claim 1, wherein a value of a ratio of a number of magnetic iron oxide particles B to a number of nonmagnetic inorganic oxide particles A present in a cross section of the toner particle provided by sectioning with a microtome is 50 to 500 when observed with transmission electron microscopy.

3. The toner according to claim 1, wherein at least 70 number % of nonmagnetic inorganic oxide particles A having a long diameter of at least 100 nm have a long diameter of 800 to 3,000 nm.

4. The toner according to claim 1, wherein a value of a ratio of a weight-average particle diameter of the toner to the number-average particle diameter of the long diameter for the nonmagnetic inorganic oxide particle A is 2 to 15.

5. The toner according to claim 1, wherein the binder resin comprises an amorphous polyester resin.

6. The toner according to claim 5, wherein a content of the amorphous polyester resin in the binder resin is at least 50 mass %.

7. The toner according to claim 1, wherein the binder resin has a number-average molecular weight (Mn) of 1,000 to 5,000.

8. The toner according to claim 1, wherein magnetic iron oxide particle B has a residual magnetization (or) of 4 to 18 $Am^2/kg$.

* * * * *